United States Patent

Hinkley

[15] 3,700,730
[45] Oct. 24, 1972

[54] 2-CARBOXY OR 2-CARBOXYLOWER ALKYL DERIVATIVES OF 5-FLUORO-1-(P-METHYLSULFINYL-BENZYLIDINE)-INDENYL-3-ACETIC ACID

[72] Inventor: David F. Hinkley, Plainfield, N.J.
[73] Assignee: Merck & Co., Inc., Rahway, N.J.
[22] Filed: May 1, 1970
[21] Appl. No.: 33,973

[52] U.S. Cl..........260/515 A, 260/345.7, 260/429.9, 260/456 P, 260/488 CD, 260/420, 260/607 A, 424/317
[51] Int. Cl..............................................C07c 147/00
[58] Field of Search.......................260/470, 515 A

[56] References Cited

UNITED STATES PATENTS 3,609,184 9/1971 Miyai et al..............260/470 X
3,654,349 8/1972 Shen et al...............260/470 X

*Primary Examiner*—Lorraine A. Weinberger
*Assistant Examiner*—John F. Terapane
*Attorney*—Martin L. Katz, Harry E. Westlake, Jr. and I. Louis Wolk

[57] ABSTRACT

Process for preparing 1-(p-methylsulfinylbenzylidene)-2-methyl-5-fluoro-3-indenylacetic acid by methylating 1-(p-methylsulfinylbenzylidene)-5-fluoro-3-indenylacetic acid or a derivative thereof. Also included are novel 1-(p-methylsulfinylbenzylidene)-5-fluoro-3-indenylacetic acid intermediates.

4 Claims, No Drawings

2-CARBOXY OR 2-CARBOXYLOWER ALKYL DERIVATIVES OF 5-FLUORO-1-(P-METHYLSULFINYL-BENZYLIDINE)-INDENYL-3-ACETIC ACID

This invention relates to a process for preparing novel 5-fluoro-2-methyl-1-(p-methylsulfinylbenzylidene)-3-indenyl acetic acid. This compound has anti-inflammatory, anti-pyretic and analgesic activity and is useful in the treatment of diseases which exhibit pain, fever or inflammation. In the treatment of such diseases, 5-fluoro-2-methyl-1-(p-methylsulfinylbenzylidene)-3-indenyl acetic acid may be administered topically, orally, rectally or parenterally in dosage ranges of from about 0.1 mg. to 50 mg./kg. body weight per day (preferably from about 1 mg. to 15 mg./kg. body weight per day).

In the past other 1-benzylidene-3-indenyl acetic acids have been prepared by condensing a substituted benzaldehyde with a substituted acetic acid ester in a Claisen Reaction or with an α-halogenated propionic acid ester in a Reformatsky Reaction. The resulting unsaturated ester was reduced and hydrolyzed to give a β-aryl propionic acid which was ring closed to form an indanone. The aliphatic acid side chain was then introduced by a Reformatsky or Wittig Reaction and the 1-substituent was introduced into the resultant indenyl acetic acid or ester by reacting said acetic acid derivative with an aromatic aldehyde or ketone of the desired structural formula and dehydrating to form the desired indenyl acetic acid.

It is an object of this invention to provide new processes for preparing 5-fluoro-2-methyl-1-(p-methylsulfinylbenzylidene)-3-indenyl acetic acid. It is a further object of this invention to provide new processes for preparing this compound in which the methyl substituent is introduced as a last step in the preparation of 5-fluoro-2-methyl-1-(p-methylsulfinylbenzylidene)-3-indenyl acetic acid. Other objects will become apparent hereinafter.

In accordance with this invention, it has been discovered that 5-fluoro-2-methyl-1-(p-methylsulfinylbenzylidene)-3-indenyl acetic acid of the formula:

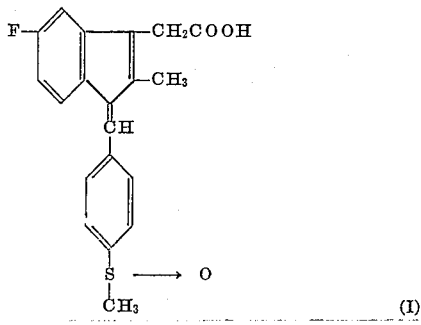

may be prepared by forming a methyl group at the 2-position of the appropriately substituted indene nucleus. Among the various procedures that may be employed in the practice of the invention may be included the following:

I 1-(p-Methylsulfinylbenzylidene)-5-fluoroindene is treated with at least two equivalents of methyl diazoacetate. Irradiation of the reaction mixture with ultra-violet light results in the formation of methyl-1-(p-methylsulfinylbenzylidene)-2-methoxycarbonylmethyl-5-fluoro-3-indenyl acetate. The di-ester is then de-esterified with a reagent such as lithium iodide in 2,6-litidine to produce 1-(p-methylsulfinylbenzylidene)-2-carboxymethyl-5-fluoro-3-indenyl acetic acid. The 2,3-diacid is then decarboxylated to obtain the compound of Formula I. The decarboxylation can be effected by dissolving 1-(p-methylsulfinylbenzylidene)-2-carboxymethyl-5-fluoro-3-indenyl acetic acid in an inert solvent and heating the solution until the evolution of carbon dioxide ceases. Evolution of carbon dioxide begins when the solution is heated to a temperature of above 30° C. More rapid evolution is attained at higher temperatures. The solution may be heated to the reflux temperature of the solvent for more rapid decarboxylation. Solvents which may be used for the purposes of this reaction are aromatic hydrocarbons such as benzene, toluene and xylene; halogenated aromatic solvents such as chlorinated benzene, including monochloro-and dichlorobenzene; halogenated aliphatic hydrocarbons such as chloroform or methylene dichloride; and high boiling ethers such as glyme and diglyme.

After decarboxylation, the desired compound of Formula I may be isolated by evaporation of the solvent in vacuo and recrystallization of the residue in ethyl acetate affords the pure cis product.

II. 1-(p-Methylsulfinylbenzylidene)-5-fluoroindene is treated with one equivalent of methyl diazoacetate. Irradiation of the reaction mixture with ultraviolet light results in the formation of methyl-1-(p- methylsulfinylbenzylidene)-5-fluoro-3-indenyl acetate which is hydrolyzed with a base such as sodium hydroxide to obtain sodium-1 -(p-methylsulfinylbenzylidene)-5-fluoro-3 indenyl acetate. The acetate thus obtained is treated with a methylating agent such as diazomethane to obtain the compound of Formula I.

Other methylating agents useful in the practice of the present invention are cyclodiazomethane and other reagents which generate methyl radicals, e.g., azomethane, lead tetra-acetate, dimethylsulfoxonium methylide, acetylperoxide and acetyl peresters such as t-butyl peracetate.

Solvents may be used to dissolve the 3-indenyl acetate before methylation is effected. These solvents are inert aprotic solvents such as dimethylformamide, dimethylsulfoxide, tetrahydrofuran, toluene, dioxane and ether.

Ambient temperatures (e.g., 10°–35° C.) can be employed in the methylation step. The reaction proceeds with or without the aid of elevated temperatures.

The desired product of Formula I can be recovered from the reaction product by simple filtration procedure. Purification of the precipitate may be effected, if desired, by recrystallization from ethyl acetate to obtain the pure cis product.

III. 1-(p-Methylsulfinylbenzylidene)-5-fluoro-indene is treated with one equivalent of methyl diazoacetate. Irradiation of the reaction mixture with ultraviolet light results in the formation of methyl-1 -(p-methylsulfinylbenzylidene)-5-fluoro-3-indenyl acetate which is treated with an acid such as hydrochloric acid to obtain 1-(p-methylsulfinylbenzylidene)-5-fluoro-3-indenylacetic acid. The acid thus obtained is treated with a methylating agent such as methyl chloride in the presence of a catalyst such as aluminum chloride to obtain the compound of Formula I.

Other methylating agents suitable for practicing the present invention are conventional Friedel-Crafts catalysts used in conjunction with the compound "CH₃X" wherein X is bromo, iodo, hydroxy, methosulfate, methocarbonate, tosyloxy, aryl sulfonate, alkyl sulfonate, and the like. Any conventional Friedel-Crafts catalyst may be used, e.g., AlBr₃, FeCl₃, anhydrous HF, BCl₃, BF₃, concentrated H₂SO₄, and the like. The metallic halides such as AlCl₃ and FeCl₃ are preferred.

Solvents are preferably used to conduct the methylation reaction. These may be inert halogenated hydrocarbons such as alkylene halides (e.g., methylene dichloride, ethylene dichloride, monochlorobenzene or dichlorobenzene, etc.).

The methylation reaction can be conducted at any temperature between the freezing and boiling point of the solvent used as the reaction medium.

IV   1-(p-Methylsulfinylbenzylidene)-2-hydroxymethyl -5-fluoro-3-indenyl acetic acid is treated with at least one equivalent of tosyl chloride to obtain 1-(p-methylsulfinylbenzylidene)-2-tosyloxymethyl-5-fluoro-3-indenylacetic acid. The substituted indenyl acid thus obtained is treated with an alkali halide such as lithium halide to obtain 1-(p-methylsulfinylbenzylidene)-2-chloromethyl -5-fluoro-3-indenylacetic acid. The compound is then treated with an organo-metallic halide such as methyl magnesium chloride and metallic magnesium to obtain the magnesium salt of 1-(p-methylsulfinylbenzylidene)-2-chloromagnesiomethyl-5-fluoro-3-indenylacetic acid intermediate which is hydrolyzed with an acid such as hydrochloric acid to obtain the cis-compound of Formula I.

The organo metallic halide intermediate, 1-(p-methylsulfinylbenzylidene-2-halometallo-methyl -5-fluoro-3-indenyl-acetic acid, may also be prepared by disolving, in an ether such as ethyl ether, dioxane or, preferably, tetrahydrofuran and adding the metal corresponding to the desired organo-metallic intermediate. Thus, one can add zinc, an alkali metal or magnesium. The reaction should be conducted under anhydrous conditions. Although the organo-metallic compound can be formed without heating, it may be necessary to heat mildly in order to complete the reaction to form the organo-metallic intermediate.

In general, more than 1 mole of the metal per mole of the indene compound will be needed so that some of the metal may e used to form the salt of the acetic acid side chain.

When the organo-metallic intermediate has been formed by the above procedure, it can be readily converted to the desired 1-(p-methylsulfinylbenzylidene)-2-methyl- 5-fluoro-3-indenylacetic acid by hydrolysis. The hydrolysis can be effected at room temperature or with slight heating using water or dilute acid such as dilute hydrochloric acid or dilute acetic acid. In general, it will be necessary to add 2 moles of acid for each mole of the organo-metallic material to hydrolyze both the organo-metallic side chain to a methyl and the acetic acid salt to the free acid. When the addition of water or acid is complete, the desired cis product is isolated from the reaction mixture by filtration and purified, if desired, by crystallization from ethyl acetate.

V.   1-(p-Methylsulfinylbenzylidene)-2-hydroxymethyl -5-fluoro-3-indenylacetic acid is treated with at least one equivalent of tosyl chloride to obtain 1-(p-methylsulfinylbenzylidene)-2-tosyloxymethyl-5-fluoro-3-indenylacetic acid. The substituted indenyl acid thus obtained is hydrogenated in the presence of a catalyst such as W2 raney nickel to obtain the cis compound of Formula I.

The solvents useful in the reduction step may be other alkanols such as methanol, propionol and the like. The temperature range for the reduction is 20°–100 °C. The pressure may be atmospheric or higher. The reduction may be accomplished with palladium or platinum on a support such as carbon.

VI.   1-(p-Methylsulfinylbenzylidene)-2-hydroxymethyl -5-fluoro-3-indenylacetic acid is treated with at least one equivalent of tosyl chloride to obtain 1-(p-methylsulfinylbenzylidene)-2-tosyloxymethyl-5-fluoro-3-indenylacetic acid. The acid is treated with a base such as sodium bicarbonate in combination with a solvent such as dimethylsulfoxide to obtain 1-(p-methylsulfinylbenzylidene)-2-aldehydo-5-fluoro-3-indenylacetic acid. The 2-aldehydo acid thus obtained is treated with a salt forming reagent such as hydrazine to obtain the hydrazine salt of 1-(p- methylsulfinylbenzylidene)-2-hydrazono-5-fluoro-3-indenylacetic acid. The salt of the 2-hydrazono compound thus obtained is treated with an alkali metal t-butoxide such as potassium t-butoxide to obtain the cis compound of Formula I.

In preparing the hydrazone, it is desirable to use at least 2 moles of hydrazine for each mole of the compound of aldehyde. In so doing, the extra mole of the hydrazine reacts with the carboxyl group on the acetic acid chain.

The 2-hydrazone is converted to the desired compound of Formula I by reduction under special conditions. In accordance with this invention, the most suitable method for converting the hydrazine salt to a desired compound of Formula I comprised treating said compound with a mixture of an alkali metal t-butoxide and dimethyl sulfoxide (DMSO). In general, about 2 moles of the butoxide should be employed for each mole of the hydrazine salt, although this ratio can be varied within limits. The reaction will normally be effected in about 8 hours, although it is feasible to maintain reaction conditions for periods as short as 4 hours or longer than 8 hours. After reaction has been completed, the reaction mixture is diluted with water and then extracted with a halogenated aliphatic hydrocarbon solvent, such as methylene chloride. The remaining aqueous phase is acidified with an acid such as hydrochloric acid to pH 5 to give the product as a precipitate. The precipitate is filtered off and purified by recrystallization from ethyl acetate to give a desired product of Formula I in purified form.

As an alternative to the above described procedure for producing the compound of Formula I, it is possible to convert 1-(p-methylsulfinylbenzylidene)-2-aldehydo-5-fluoro-3-indenylacetic acid to its hydrazone and simultaneously reduce the hydrazone to the 2-methyl radical. In general, it is desirable, however, to conduct the conversion of the compound to Formula I by the two-step method wherein the formation of the hydrazone and its reduction are conducted in two separate operations.

VII The sodium salt of 1-(p-methylsulfinylbenzylidene)-5-fluoro-2-indanone-3-acetic acid is treated with at least one equivalent of a methylating reagent such as methylenetriphenylphosphorane to obtain the cis compound of Formula I. The reaction may be carried out with or without heat. Other solvents such as dioxane or tetrahydrofuran are useful in the practice of the invention.

The compound of Formula I may be prepared alternatively from the 1,3,5-substituted-2-indanone by the Grignard synthesis employing a Grignard reagent such as methylmagnesium chloride.

The starting materials utilized in the following examples are 1-(p-methylsulfinylbenzylidene)-5-fluoroindene, 1-(p-methylsulfinylbenzylidene)-2-hydroxymethyl-5-fluoro-3-indenylacetic acid and the sodium salt of 1-(p-methylsulfinylbenzylidene)-5-fluoro-2-indanone-3-acetic acid and may be prepared employing the following procedures:

A. 1-(p-Methylsulfinylbenzylidene)-5-fluoroindene is prepared by cyclizing β-(p-fluorophenyl)-propionic acid to form the indanone. The indanone is then reduced and treated with acid to obtain 5-fluoroindene. The 1-substituent may then be introduced by reacting the 5-fluoroindene with -methylsulfinylbenzaldehyde to obtain the starting material which is utilized in Examples 1–3.

B. 1-(p-Methylsulfinylbenzylidene)-2-hydroxy methyl-5-fluoro-3-indenylacetic acid is prepared as shown by Flow Sheet I and described thereinafter.

The 5-hydroxylevulinic acid pyranyl ether ester (II) is prepared from 5-hydroxylevulinic acid (I) by treatment with 2.1 equivalents of dihydropyrane in tetrahydrofuran solution containing a few drops of concentrated hydrochloric acid catalyst. The product II is purified by distillation and then refluxed under nitrogen for 5 hours in anhydrous benzene with one equivalent of p-fluorophenylmethylchloride. The benzene solvent is removed under reduced pressure, leaving pyranyl 5-fluoro-2-pyranyloxymethylindenyl-3-acetate (III). This is purified and treated with sodium hydride in dimethylformamide solution followed by treatment with one equivalent of p-methylsulfinylbenzaldehyde. The resulting ester (IV) is then depyranylated by stirring with a small amount of concentrated hydrochloric acid for 5 hours at room temperature in t-butanol as solvent. The product, 1-(p-methylsulfinylbenzylidene)-2-hydroxymethyl-5-fluoro-3-indenylacetic acid (V) which is obtained is employed in Examples 4–6.

C. The sodium salt of 1-(p-methylsulfinylbenzylidene)-5-fluoro-2-indanone-3-acetic acid is prepared by treating 5-fluoro-2indanone with a chloroacetic ester via the Reformatsky reaction to introduce the aliphatic side chain. The 1-substituent may then be in-

FLOW SHEET I

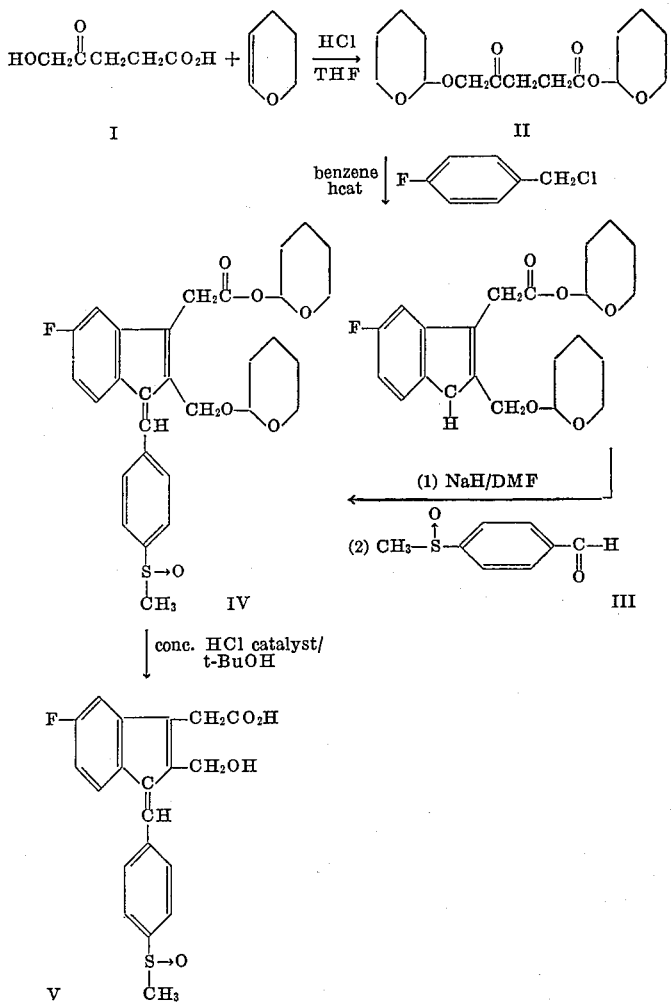

troduced by reacting the indanone with p-methylsulfinylbenzaldehyde to obtain 1-(p-methylsulfinylbenzylidene)-5-fluoro-2-indanone-3-acetate which is then converted to the sodium salt of 1-(p-methylsulfinylbenzylidene)-5-fluoro-2-indanone-3-acetic acid, which is utilized in Example 7.

It should be noted by one skilled in the art that 5-fluoro-2-methyl-1-(p-methylsulfinylbenzylidene)-3-indenyl acetic acid may be isomerized into its cis and trans isomers by procedures well known in the art. The cis isomer is that isomeric form in which the benzylidene function is aligned under the phenyl ring of the indene nucleus. It should be further noted that the cis isomer is substantially more active than the trans isomer.

It should be further noted by one skilled in the art that cis-5-fluoro-2-methyl-1-(p-methylsulfinylbenzylidene)-3-indenyl acetic acid is asymmetric and may be resolved into its (+) and (−) forms by procedures well known in the art.

It should be further noted by one skilled in the art that this compound is polymorphic and has more than one crystalline structure.

The following examples are presented to further illustrate the present invention.

EXAMPLE 1

5-Fluoro-2-methyl-1-(p-methylsulfinylbenzylidene)-indenyl-3-acetic acid

A. Methyl 5-fluoro-2-methoxycarbonylmethyl-1-p-methylsulfinylbenzylidene-3-indenyl acetate To 0.01 mole of 1-p-methylsulfinylbenzylidene-5-fluoro indene in 100 ml. of tetrahydrofuran is added a solution of 0.021 mole of methyl diazoacetate in 25 ml. of tetrahydrofuran. When the addition is completed (15 minutes), the reaction mixture is irradiated with ultraviolet light until nitrogen evolution ceases. The temperature is kept at 20°–25° C. during the irradiation by external cooling. When the irradiation period is over, the reaction mixture is poured into 1 liter of ice water and the precipitated product is filtered off and purified by recrystallization from t-butanol.

B. 5-Fluoro-1-(p-methylsulfinylbenzylidene)-indene-2,3-diacetic acid

A stirred mixture of methyl 5-fluoro-2-methoxy-carbonylmethyl-1-(p-methylsulfinylbenzylidene)-3-indenyl acetate (0.01) mole, 17 g. of anhydrous lithium iodide and 400 ml. of freshly distilled 2,6-lutidine is refluxed under nitrogen for 8 hours. On cooling to room temperature, 100 ml. of chloroform and 100 ml. of 2N-hydrochloric acid are added, and, after shaking, the layers are separated. The aqueous phase is back-extracted with chloroform. The combined organic extracts are washed well with cold diluted hydrochloric acid (two portions of 100 ml.), with water (two portions of 100 ml.), then dried over magnesium sulfate. Removal of the solvent under reduced pressure gives the product.

C. A solution of 20 g. (0.05 mole) of 1-(4'-p-methylsulfinylbenzylidene)-2-carboxymethyl-5-fluoroindene-3-acetic acid in 50 ml. of o-dichlorobenzene is refluxed to cessation of carbon dioxide evolution. The solvent is then removed in vacuo to leave a residue which on recrystallization from ethyl acetate gives the cis 2-methyl-3-indenyl acetic acid, m.p. 184°–186° C.

EXAMPLE 2

5-Fluoro-2-methyl-1-(p-methylsulfinylbenzylidene)-indenyl-3-acetic acid

A. Sodium-5-fluoro-1-(p-methylsulfinylbenzylidene)-3-indenyl acetate

To 0.01 mole of 1-p-methylsulfinylbenzylidene-5-fluoroindene in 100 ml. of tetrahydrofuran is added a solution of 0.011 mole of methyl diazoacetate in 25 ml. of tetrahydrofuran. When the addition is completed (15 minutes), the reaction mixture is irradiated with ultraviolet light until nitrogen evolution ceases. The temperature is kept at 20°–25° C. during the irradiation by external cooling. When the irradiation period is over, the reaction mixture is poured into 1 liter of ice water and the precipitate product is filtered.

After hydrolysis with sodium hydroxide, there is obtained sodium 1-(p-methylsulfinylbenzylidene)-5-fluoro-3-indenyl acetate.

B. A solution of 3.64 g. (0.01 mole) of sodium 1-(4'-methylsulfinylbenzylidene)-5-fluoroindene-3-acetate in 200 ml. of dimethylformamide is treated with a cold solution of 0.02 mole of diazomethane in 10 ml. of anhydrous ether under irradiation to the cessation of nitrogen evolution. The reaction is then diluted with an equal volume of water, extracted with ethylacetate, dried and the 2-methyl compound precipitated with petroleum ether. Recrystallization from ethylacetate gives pure cis product, m.p. 184°–186° C.

EXAMPLE 3

5-Fluoro-2-methyl-1-(p-methylsulfinylbenzylidene)-3-indenyl acetic acid

A. 5-Fluoro-1-(p-methylsulfinylbenzylidene)-3-indenylacetic acid

To (0.01) mole of 1-(p-methylsulfinylbenzylidene)-5-fluoroindene in 100 ml. of tetrahydrofuran is added a solution of 0.011 mole of methyl diazoacetate in 25 ml. of tetrahydrofuran. When the addition is completed (15 minutes), the reaction mixture is irradiated with ultraviolet light until nitrogen evolution ceased. The temperature is kept at 20°–25° C. during the irradiation by external cooling. When the irradiation period is over, the reaction mixture is poured into 1 liter of ice water and the precipitated product, methyl 1-(p-methylsulfinylbenzylidene)-5fluoro-3-indenyl acetate is treated with hydrochloric acid to obtain the product.

B. To a suspension of 2.4 g. (0.01 mole) of dry aluminum chloride in 25 ml. of ethylene dichloride is added 1.71 g. (0.005 mole) of the desmethyl indenyl acid of the preceding step in an equal volume of the same solvent followed by 0.25 g. (0.005 mole) of methyl chloride in 5 ml. of the same solvent. The mixture is stirred to cessation of hydrogen chloride evolution and then quenched with 250 g. of ice. The organic layer is separated, washed with water, dried and evaporated in vacuo to dryness. The residue is purified by recrystallization from ethyl acetate, yielding the cis product, m.p. 184°–186° C.

EXAMPLE 4

1-(p-Methylsulfinylbenzylidene)-2-methyl-5-fluoro-3-indenylacetic acid

A. 1-(p-Methylsulfinylbenzylidene)-2-tosyloxymethyl-5-fluoro-3endenylacetic acid To a stirred solution of (0.01) mole of 1-(p-methylsulfinylbenzylidene)-2-hydroxy methyl-5-fluoro-3-indenylacetic acid in 200 ml. of pyridine is added (0.01) mole of tosyl chloride with continued agitation for 3 hours. Water is added and after addition of dilute hydrochloric acid, the precipitated 1-(p-methylsulfinylbenzylidene)-2-tosyloxymethyl-5-fluoro-3indenylacetic acid is collected.

B. 1-(p-Methylsulfinylbenzylidene)-2-chloromethyl-5-fluoro-3-indenylacetic acid

A solution of 1-(p-methylsulfinylbenzylidene)-2-tosyloxymethyl-5-fluoro-3-indenylacetic acid (0.1 equivalent) in 100 ml. of acetone containing 0.1 equivalent of lithium chloride is stirred for 48 hours at 25°C. The reaction mixture is concentrated in vacuo and the residue taken up in ether and filtered. The filtrate on concentration gives 1-(p-methylsulfinylbenzylidene)-2-chloromethyl -5-fluoro-3-indenylacetic acid.

The 2-bromomethyl and 2-iodomethyl derivatives are similarly obtained using lithium bromide and iodide, respectively, in the foregoing procedure.

C. To a solution of 3.9 g. (0.01 mole) of 1-(4'-p-methylsulfinylbenzylidene) -2-chloromethyl-5-fluoroindene-3-acetic acid in 250 ml. of dry tetrahydrofuran is added 0.01 mole of methyl magnesium chloride in the same ether. After cessation of the evolution of gas 3 g. of magnesium turnings and a crystal of iodine are added. The mixture is stirred briefly, filtered to remove the excess magnesium and then hydrolyzed by addition of 10 ml. of dilute hydrochloric acid. Water is added to precipitate the crude 2-methyl compound which on recrystallization from ethylacetate melts at 184°–186° C.

EXAMPLE 5

1-(p-Methylsulfinylbenzylidene)-2-methyl-5-fluoro-3-indenylacetic acid

A. 1-(p-Methylsulfinylbenzylidene)-2-tosyl-oxymethyl-5-fluoro-3-endenylacetic acid To a stirred solution of (0.01) mole of 1-(p-methylsulfinylbenzylidene)-2-hydroxy methyl-5-fluoro-3-indenyl acetic acid in 200 ml. of pyridine is added (0.01) mole of tosyl chloride with continued agitation for 3 hours. Water is added and after addition of dilute hydrochloric acid, the precipitated 1-(p-methylsulfinylbenzylidene)-2-tosyloxymethyl-5-fluoro-3-indenylacetic acid is collected.

B. A mixture of 5.27 g. (0.01 mole) of the 2-tosyloxymethyl derivative in 100 ml. of ethanol is shaken with 4 g. of W2 Raney nickel under 45 p.s.i. of hydrogen at 25° C. to uptake of theory. The mixture is filtered, diluted with water and the precipitated crude 2-methyl compound isolated. Recrystallization gives the cis compound 184°–186° C.

EXAMPLE 6

5-Fluoro-2-methyl-1-(p-methylsulfinylbenzylidene)-3-indenylacetic acid

A. 1-(p-Methylsulfinylbenzylidene)-2-tosyloxymethyl-5-fluoro-3-indenylacetic acid To a stirred solution of (0.01) mole of 1-(p-methysulfinylbenzylidene)-2-hydroxy methyl-5-fluoro-3-indenylacetic acid in 200 ml. of pyridine is added (0.01) mole of tosyl chloride with continued agitation for 3 hours. Water is added and after addition of dilute hydrochloric acid, the precipitated 1-(p-methylsulfinylbenzy-lidene)-2-tosyloxy-methyl-5-fluoro-3-indenylacetic acid is collected.

B. 1-(p-Methylsulfinylbenzylidene)-2-aldehydo-5-fluoro-3-indenylacetic acid

To anhydrous dimethylsulfoxide (75 ml.) preheated to 100° C. is added cautiously (foaming) anhydrous sodium bicarbonate (10 g.) followed by 1-(p-methylsulfinylbenzylidene-2-tosyoxymethyl-5-fluoro-3-indenylacetic acid (0.01 mole). The mixture is stirred well under nitrogen at 100° C. for 5 minutes, then rapidly cooled to room temperature and quenched into 500 ml. of water. After extraction with chloroform (2×100 ml.), the aqueous phase is acidified with dilute hydrochloric acid, the precipitated 1-(p-methylsulfinylbenzylidene)-2 -aldehydo-5-fluoro-3-indenylacetic acid filtered off and purified by crystallization from t-butanol.

The aldehyde may be prepared alternatively from the 2-hydroxymethyl derivative by oxidation with chromic anhydridepyridine complex.

C. 1-(p-Methylsulfinylbenzylidene)-2-aldehyde hydrazono salt-5-fluoro-3-indenylacetic acid A solution of 1-(p-methylsulfinylbenzylidene)-2-aldehydo-5-fluoro-3-indenylacetic acid in 100 ml. ethanol is treated with 0.64 g. (0.02) mole of hydrazine. The solvent is then removed under reduced pressure to afford the hydrazine salt of the aldehyde of 1-(p-methylsulfinylbenzylidene-2-aldehydo-5-fluoro-3-indenylacetic acid. This intermediate is used in the next step without further purification.

D. 4.16 g. (0.01 mole) of the hydrazine salt of the 2-hydrazono derivative is added portion-wise to 2.24 g. (two equivalents) of potassium t-butoxide in 25 ml. of DMSO over several hours at 25° C. The mixture is diluted with water, extracted with ethyl acetate, dried, and evaporated in vacuo to dryness. Recrystallization of the residue from ethyl acetate-petroleum ether gives the purified cis compound, m.p. 184°–186° C.

EXAMPLE 7

1-(p-Methylsulfinylbenzylidene)-2-methyl-5-fluoro-3-indenylacetic acid

To 0.01 mole of methylenetriphenylphosphorane as prepared by Wittig or Schoellkopf in 30 ml. of ether is added 3.76 (0.01 mole) of the sodium salt of 1-(4'-p-methylsulfinylbenzylidene)-5-fluoro-2-indanone-3-acetic acid. The mixture is aged overnight, acidified and the triphenylphosphine oxide removed. Evaporation gives a crude residue which on recrystallization from ethyl acetate gives the cis compound, m.p. 184°–186° C.

What is claimed is:

1. A compound of the formula:

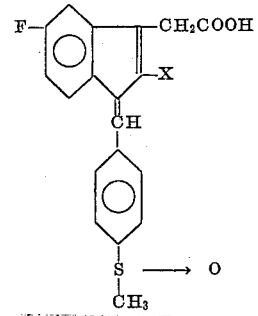

wherein X is carboxy or carboxyloweralkyl.

2. A compound as in claim 1 wherein X is carboxy.

3. A compound as in claim 1 wherein X is carboxyloweralkyl.

4. A compound as in claim 3 wherein X is carboxymethyl.

* * * * *